United States Patent Office 2,826,103
Patented Mar. 11, 1958

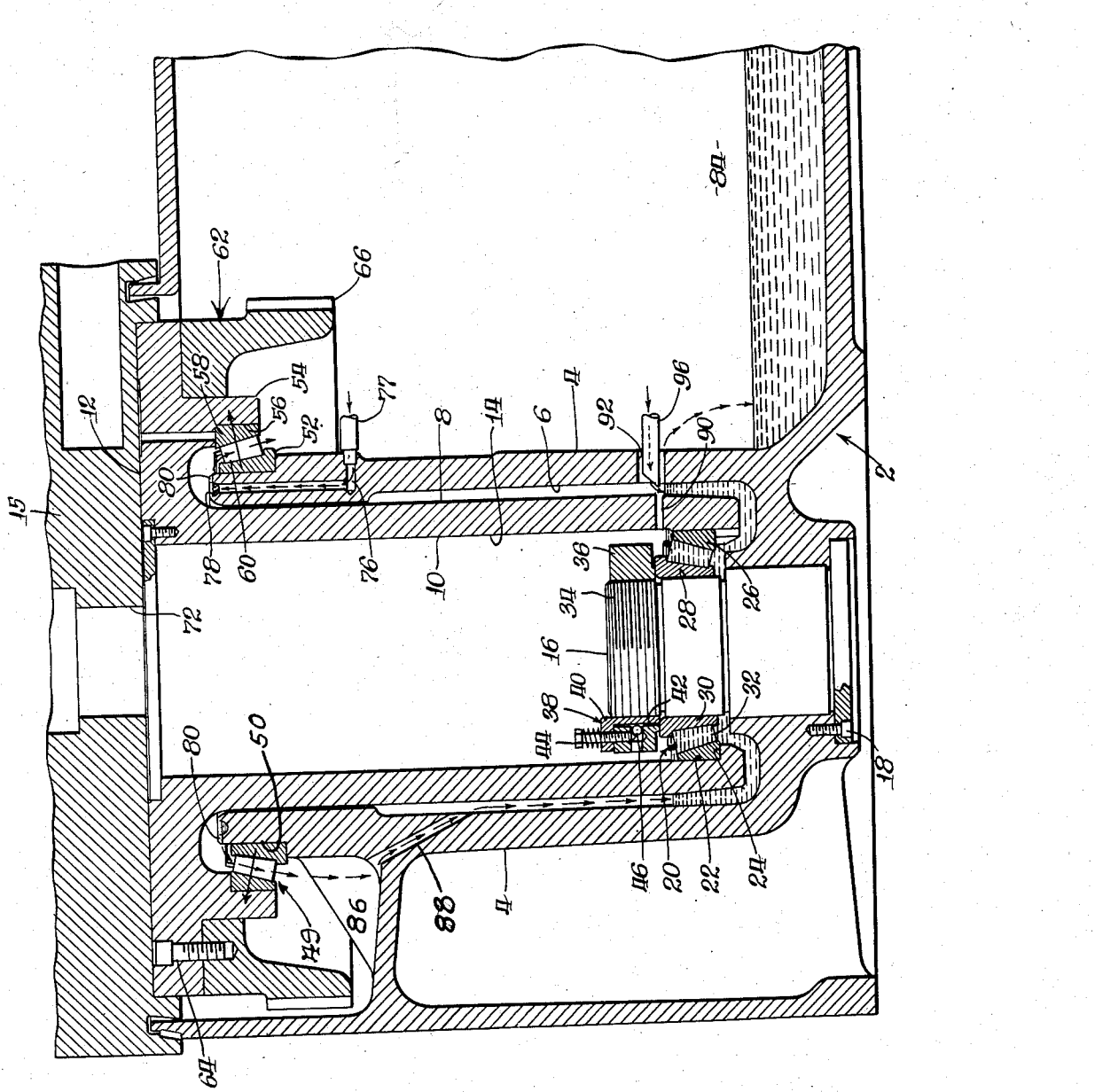

2,826,103

BORING MILL TABLE BEARING

Theodore Foster, Cincinnati, Ohio, assignor to American Steel Foundries, Chicago, Ill., a corporation of New Jersey Application August 17, 1953, Serial No. 374,584

14 Claims. (Cl. 77—63)

The invention relates to a rotatable table mounting arrangement and more particularly to a novel arrangement utilized on a boring mill.

It is a general object of the invention to device a table mounting for a boring mill whereby the table spindle may be readily disassembled from above the machine without the necessity of having a pit under the mill to facilitate removal of the table spindle from the machine base.

It is another general object of the invention to eliminate the heretofore conventional bevel gear drive for the table of a boring mill whereby unwanted thrusts and the like are eliminated and the possibility of table deflection during machining is reduced to a minimum.

It is a more specific object of the invention to provide a table mounting bearing arrangement wherein the supporting force is directed outwardly from the base to a flange of the table carrying spindle, thus affording more stable mounting for the spindle and table than has heretofore existed in the art.

It is another specific object of the invention to provide a larger bearing diameter at the upper end of the table carrying spindle whereby the bearing directly supports the spindle flange and is in improved relation to the table diameter and the flange supported table drive gear whereby deflections of the table and spindle will be reduced to a minimum.

It is an additional specific object of the invention to provide a novel continuous flow oil system to lubricate the spindle bearings and to utilize in said system the pumping action of tapered roller bearings to aid in this lubrication.

The foregoing and other objects and advantages of the invention will become apparent from a consideration of the following specification and the accompanying drawing, wherein the single figure is a central, vertical, sectional view through a boring mill base and table embodying the invention.

Describing the invention in detail, a conventional boring mill machine base indicated at 2 is employed, said base comprising upstanding walls 4, preferably of cylindrical formation defining a hollow or cavity 6 wherein is received, in telescoped relation, a spindle 8. The spindle comprises a body 10 and at the upper end of the body a horizontally directed flange 12. A table 15 is mounted on the spindle flange 12 and may be secured thereto in any suitable manner. The spindle 8 is hollow as at 14 and, when the spindle is telescoped within the base 2, receives in said hollow an upwardly projecting segment 16 which is secured at its lower end to the base 2 by means of conventional cap screws or studs 18.

A bearing connection is made between the spindle 8 at its lower end and an adjacent portion of the segment 16, said bearing connection utilizing a conventional thrust type tapered roller bearing indicated generally at 20. As will be readily seen from the drawing, the spindle 8 at its lower end comprises a cylindrical surface 22 and an upwardly facing abutment 24, said abutment and surface receiving and retaining a cup 26 of the thrust bearing 20.

Immediately adjacent the cup 26 the segment 16 provides a cylindrical portion 28 to receive a bearing cone 30 of the thrust bearing 20. The cone 30 and the cup 26 are interconnected by standard tapered roller bearings 32, the small end of the tapered roller bearing being directed downwardly, as seen in the drawing. Immediately above the portion 28 the segment 16 presents a threaded portion indicated at 34, said threaded portion threadably receiving an adjusting nut 36 which is positioned to abut the inner race or cone 30 of the bearing assembly 20. Thus it will be seen that the adjusting nut 36 serves to lock the bearing assembly 20 in position and in turn to maintain the spindle 8 in position in the machine base 2.

An adjusting nut locking device indicated generally at 38 serves to maintain the adjusting nut in any predetermined position, said adjusting nut locking device comprising a key 40 received within a slot 42 formed in the adjusting nut and abutting the threaded portion 34 of the segment 16. A spring loaded lock screw 44 is threadably received in the adjusting nut 36 and at its lower end is in cammed engagement with a ball 46, which upon adjustment of the lock screw is urged to engage the key 38 and force same against the threaded portion 34 of the segment 16.

At the upper end of the spindle 8 a bearing connection between the base and the flange 12 is provided. Referring to the drawing, it will be seen that the bearing connection again comprises a conventional thrust type roller bearing indicated generally at 49. The vertical base wall 4 is cylindrically machined at 50 to receive a cone 52 of the upper bearing assembly 49. The spindle flange 12 presents a depending wall 54 which surrounds the machine base wall 4 and is cylindrically machined as at 56 to receive the conventional outer race or cup 58 of the bearing assembly 49. The cone 52 and the cup 58 are interconnected by the conventional tapered roller bearings indicated at 60 and, it should be noted, that the roller bearings 60 have their small end directed upwardly.

Radially outboardly of the bearing assembly 49 a table drive ring gear, indicated generally at 62, is mounted to the spindle flange 12 in any suitable manner, for example, by the bolts or studs 64. The drive gear 62 will be seen to comprise gear teeth 66, said teeth being cylindrically arranged relative to the axis of rotation of the spindle 8.

To more fully understand the present invention, it will be noted that the upper bearing assembly 49 supports the entire weight of the spindle-table assembly. The particular arrangement of the upper bearing assembly having tapered roller bearings converging upwardly toward the vertical axis of rotation results in the supporting force being directed outwardly from the base walls 4 through the bearing assembly 49 toward the ring gear 62. The direction of support is indicated by the arrows drawn through the upper bearing assembly 49. Additionally, it will be noted that the bearing assembly 49 offers support for the spindle 8 through the walls 54 formed on the flange 12 of the spindle 8, the support thereby being offered outboardly of the spindle body 10 and more nearly approximating the diameter of the work carrying table. The invention also employs the table drive gear having gear teeth 66 cylindrically arranged relative to the axis of rotation of the spindle-table assembly instead of the beveled drive gear heretofore employed in the art. The teeth 66 may be either vertically formed spur teeth or teeth cut on a helix angle, the spur teeth being used on the larger mills while helical teeth are preferably utilized on the smaller mills. The particular location of the bearing assembly 49 enables said assembly to more satisfactorily counteract driving thrusts directed transversely of the axis of rotation. The employing of the cylindrically formed gears 66 eliminates upward thrusts on the spindle flange 12 and consequent upward thrust on the work carrying table. This latter ring gear feature also considerably eases transverse thrusts on the lower bearing assembly 20 which are normally present in heretofore existing boring mills employing a beveled drive gear.

The table 15 is provided with a bore or aperture 72, said bore being designed to receive a boring bar pilot bushing (not shown) as is well known to those skilled in the art.

To adjust or disassemble the spindle 8 the table 15 is first removed. A cap at the upper end of the spindle is then removed thereby affording access to the spindle cavity 14 and the adjusting nut 36. Upon removal of the adjusting nut 36 the spindle can be disassembled from the machine base. Reassembly of the spindle and table is readily accomplished by reversing the above order of steps.

In addition to the novel bearing arrangement the invention provides a novel lubricating system for the bearings 49 and 20. A supply passage 76 is provided in the wall 4 of the machine base 2, said supply passage 76 extending upwardly to communicate with a radial groove 78 formed at the upper end of the machine base wall 4. The passage 76 is connected to a supply line 77 which in turn communicates with the machine pump (not shown). The machine base wall additionally affords transverse slots 80 which communicate with the groove 78 thereby allowing lubricating fluid pumped into the slot 78 to spill over and bathe the upper bearing assembly 49. Normal lubricant flow within the passage 76, peripheral groove 78, the slots 80 and the bearings 49 is indicated by arrows in the figure.

It is a characteristic of tapered roller bearings to pump lubricant from the smaller diameter end of the roller to the larger diameter end of the roller, consequently, it will be readily appreciated that the pumping action of the bearing assembly 49, which has the small end of the rollers directed upwardly, aids the flow of lubricant through the bearing 49. At the right hand side of the figure, it will be seen that the lubricant flows through the bearing assembly 49 and then freely drops to an oil sump 84, afforded by the machine base 2. On the left-hand side of the figure, the lubricant flows from the bearing assembly 49 to a temporary well 86, whereat a drain passage 88 is formed in the machine base wall 4 and the lubricant is conveyed to the lower bearing assembly 20, as indicated by the arrows in said figure.

The roller bearings 32 of the lower bearing assembly 20 have their smaller diameter portion directed downwardly. Consequently, the normal pumping action of the lower bearing 20 heretofore referred to aids the flow of lubricant upwardly through the bearing and out of an escape port 90 in the spindle 8 and through another escape port 92 in the machine base wall 4 and thence to the sump 84. To additionally assure a maximum supply of lubricant to the lower bearing assembly 20, another pump connected supply line 96 is provided extending through the port 92 above the level of the bearing assembly 20. The supply line 96 assures that the lower bearing assembly 20 will be bathed in oil during all operations.

Thus it will be seen that the invention provides a novel table mounting arrangement whereby table deflection and spindle deflections are reduced to a minimum assuring a higher quality work performable by the mill. Additionally, the invention provides easy means to disassemble the table and spindle from the machine base without the necessity of having a pit underneath the machine to provide access to the various parts for disassembly. The invention further provides a novel lubricating system for the bearings of the rotatably mounted spindle. The invention also provides a comparatively large available space within the hollow spindle for the possible accommodation of a power chucking mechanism.

I claim:
1. In a mounting arrangement for a rotatable machine table, a hollow machine base, a table carrying spindle telescoped within the base, said spindle being hollow, a portion of the base telescoped within the spindle at the lower end of the latter, a bearing connecting the spindle and the portion, a flange on the upper end of the spindle, said flange extending generally perpendicular to the axis of rotation of the spindle, a bearing interconnecting the base and flange, and a drive gear connected to the flange, said gear presenting teeth cylindrically arranged relative to the axis of rotation of the spindle.

2. In a mounting arrangement for a rotatable machine table, a machine base having a wall defining a hollow therein, one end of said hollow being closed by a segment of said base, said segment projecting into said hollow, a cylindrical spindle telescoped into said hollow, said spindle surrounding at one end thereof the segment, a cylindrical surface on the lower end of the spindle, an abutment on the lower end of the spindle adjacent the surface and perpendicular to the surface, a cup carried by the spindle engaging the surface and abutment, a cone carried by the segment adjacent the cup, tapered roller bearings interconnecting the cup and cone, an adjusting nut threadably mounted on the segment and engaging the cone, means to lock said nut in a determined position, a flange at the end of the spindle opposite the mentioned end, said flange extending radially outwardly from the spindle, a peripheral wall connected to and depending from the flange, said wall being generally parallel to the axis of rotation of the spindle, said flange connected wall and said spindle receiving therebetween a portion of said base defining wall, another cone carried by said base defining wall, another cup carried by said flange connected wall, other tapered roller bearings interconnecting said other cup and cone, said tapered bearings at opposite ends of the spindle being arranged to converge on each other away from the axis of rotation of the spindle.

3. A mounting arrangement according to claim 2, and including bearing lubricating means comprising a supply line in said base wall communicating with and carrying lubricating fluid to said other tapered roller bearings, passage means to convey lubricating fluid from said other tapered bearings to the first mentioned bearings, a sump in the base, and escape means to convey said lubricating fluid from all of said bearings to the sump.

4. A mounting arrangement according to claim 3, wherein said lubricating means convey said lubricating fluid to the smaller ends of said tapered bearings.

5. A mounting arrangement according to claim 4, and including another supply line carrying lubricating fluid to the first mentioned tapered bearings.

6. In a mounting arrangement for a rotatable machine table, a base, a table carrying spindle received within the base, said spindle being hollow and receiving in telescoped relation at one end thereof a portion of the base, a bearing interconnecting the portion and the adjacent end of the spindle, demountable means disposed within the hollow spindle and connected to the portion of said base, and entrance means giving access to said hollow and said demountable means from the end opposite the mentioned end of the spindle, said demountable means being operative to retain the spindle in the base and upon removal thereof permitting the table carrying spindle to be disassembled from the base.

7. A mounting arrangement according to claim 6, wherein said bearing comprises a cone carried by the portion, said cone engaging the demountable means, a shoulder on the spindle perpendicular to the axis of rotation of the spindle, a cup carried by the spindle and engaging the shoulder, and rollers interconnecting the cup and cone, said rollers converging on the axis of rotation and away from the spindle.

8. In a mounting arrangement for a rotatable boring mill table, a base, a table carrying spindle received by the base and rotatable therein on a substantially vertical axis, a circular thrust type roller bearing at the upper end of the spindle rotatably supporting the spindle from the base, said bearing comprising cup, cone and interconnecting rollers, and a table drive ring gear mounted peripherally on the spindle and radially outwardly of the bearing, said cone being mounted on the base and the cup being mounted on the spindle intermediate the cone and ring gear, whereby the spindle support offered by the base is directed radially outwardly upwardly through the bearing toward the ring gear, another circular thrust type roller bearing at the lower end of the spindle internally thereof and rotatably interconnecting the spindle and the base, the diameter of said first mentioned thrust bearing being substantially greater than that of the second mentioned thrust bearing.

9. In a mounting arrangement for a rotatable machine table, a machine base having walls defining a hollow therein, a table carrying spindle telescoped within the hollow, bearing means interconnecting the base and the spindle at the upper end thereof, said bearing means comprising a roller type thrust bearing offering lines of support for the table directed outwardly of the bearing and upwardly toward said supported table, a table drive ring gear connected to the spindle outboardly of said bearing means, said ring gear comprising gear teeth formed parallel to the axis of rotation of the spindle, other bearing means interconnecting the lower end of the spindle and the base, said bearing means being disposed internally of the spindle, said other bearing means comprising roller thrust type bearings having bearing axes directed downwardly and in converging relation to the axis of the spindle, said first-mentioned bearing means having a diameter substantially greater than the diameter of the second bearing means.

10. In a mounting arrangement for a rotatable machine table, a hollow machine base, a table carrying spindle telescoped within the hollow base, bearing means interconnecting the base and the spindle at the upper end thereof, other bearing means interconnecting the lower end of the spindle and the base, common means for locking and adjusting said other bearing means, said common means being disposed internally of said spindle for accommodating removal of said common means and said spindle upwardly from said hollow base.

11. In a mounting arrangement for a rotatable machine table, a hollow machine base, a hollow table carrying spindle telescoped within the base, a portion of the base being telescoped within the spindle at the lower end of the latter, a bearing connecting the spindle and the portion, a flange on the upper end of the spindle, said flange extending generally perpendicular to the axis of rotation of the spindle, and a bearing interconnecting the base and flange.

12. In a mounting arrangement for a rotatable machine table, a machine base having a wall defining a hollow therein, one end of said hollow being closed by a segment of said base, said segment projecting into said hollow, a cylindrical spindle telescoped into said hollow, said spindle surrounding at one end thereof the segment, a cylindrical surface on the lower end of the spindle, an abutment on the lower end of the spindle adjacent the surface, a cup carried by the spindle engaging the surface and abutment, a cone carried by the segment adjacent the cup, tapered roller bearings interconnecting the cup and cone, an adjusting nut threadably mounted on the segment and engaging the cone, means to lock said nut in a determined position, a flange at the end of the spindle opposite the mentioned end, said flange extending radially outwardly from the spindle, a peripheral wall connected to and depending from the flange, said wall being generally parallel to the axis of rotation of the spindle, said flange connected wall and said spindle receiving therebetween a portion of said base defining wall, another cone carried by said base defining wall, another cup carried by said flange connected wall, other tapered roller bearings interconnecting said other cup and cone, said tapered bearings at opposite ends of the spindle being arranged to converge on each other away from the axis of rotation of the spindle, and a drive gear secured to the flange and presenting spur gear teeth arranged parallel to the axis of rotation of the spindle.

13. In a mounting arrangement for a rotatable machine table having a spindle; the combination of a base, spaced bearings interconnecting the base and the spindle, each of said bearings comprising tapered rollers, means for supplying oil to the small ends of the rollers of one bearing, and oil passage means connecting the large ends of said last mentioned rollers to the small ends of the rollers of the other bearing, whereby the rollers of said one bearing pump oil through said passage means to the small ends of the rollers of said other bearing and whereby said oil is pumped from the small ends of the last mentioned bearings to the large ends thereof.

14. In a mounting arrangement for a rotatable machine table carried by a spindle; the combination of a base, spaced bearings interconnecting the base and the spindle, each of said bearings comprising tapered rollers, means for supplying lubricant to the small ends of the rollers of one bearing, and passage means for receiving lubricant from the large ends of the rollers of said one bearing and conveying said lubricant to the small ends of the rollers of the other bearing.

References Cited in the file of this patent
UNITED STATES PATENTS

| | | |
|---|---|---|
| 1,737,793 | Harris | Dec. 3, 1929 |
| 2,570,444 | Henkel | Oct. 9, 1951 |
| 2,680,658 | Addison | June 8, 1954 |